US011001775B2

(12) United States Patent
Brewer et al.

(10) Patent No.: US 11,001,775 B2
(45) Date of Patent: *May 11, 2021

(54) FUEL COMPOSITION

(71) Applicant: SHELL OIL COMPANY, Houston, TX (US)

(72) Inventors: Mark Lawrence Brewer, Rijswijk (NL); John Socrates Thomaides, Berkeley Heights, NJ (US); John M. Morales, Warren, NJ (US); Qiwei He, Belle Mead, NJ (US); Philip Nigel Threlfall-Holmes, Durham (GB); Damien Christian Vadillo, Franklin, NJ (US); Nicholas James Rounthwaite, London (GB); Michael Timothy Philbin, Hopewell, NJ (US); Roger Francis Cracknell, Manchester (GB); Andrea Schuetze, Hamburg (DE)

(73) Assignee: Shell Oil Company, Houston, TX (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/575,835

(22) PCT Filed: May 19, 2016

(86) PCT No.: PCT/EP2016/061294
§ 371 (c)(1),
(2) Date: Nov. 21, 2017

(87) PCT Pub. No.: WO2016/188858
PCT Pub. Date: Dec. 1, 2016

(65) Prior Publication Data
US 2018/0127670 A1 May 10, 2018

Related U.S. Application Data

(60) Provisional application No. 62/165,232, filed on May 22, 2015.

(30) Foreign Application Priority Data

Jul. 29, 2015 (EP) .................................... 15178870

(51) Int. Cl.
| | | |
|---|---|---|
| C10L 1/196 | (2006.01) | |
| C08F 220/00 | (2006.01) | |
| C10L 10/12 | (2006.01) | |
| C10L 1/192 | (2006.01) | |
| C08F 20/18 | (2006.01) | |

(52) U.S. Cl.
CPC ............ C10L 1/1963 (2013.01); C08F 20/18 (2013.01); C10L 1/192 (2013.01); C10L 10/12 (2013.01); C08F 2500/01 (2013.01); C10L 2230/22 (2013.01); C10L 2270/026 (2013.01)

(58) Field of Classification Search
CPC .... C08F 220/00; C08F 220/18; C08F 212/08; C10L 1/195
See application file for complete search history.

(56) References Cited

U.S. PATENT DOCUMENTS

| | | | |
|---|---|---|---|
| 4,188,219 A | 2/1980 | Cawley | |
| 4,208,190 A | 6/1980 | Malec | |
| 2009/0064568 A1* | 3/2009 | Stohr | ...................... C10L 1/196 44/308 |
| 2011/0192076 A1* | 8/2011 | Hess | ...................... C10L 10/16 44/388 |

FOREIGN PATENT DOCUMENTS

| | | |
|---|---|---|
| AU | 2013361819 A1 | 5/2015 |
| CN | 103992428 A | 8/2014 |
| EP | 0147240 A2 | 7/1985 |
| EP | 0147873 A1 | 7/1985 |
| EP | 0482253 A1 | 4/1992 |
| EP | 0567516 A1 | 9/1993 |
| EP | 0583836 A1 | 2/1994 |
| EP | 0613938 A1 | 9/1994 |
| EP | 0626442 A1 | 11/1994 |
| EP | 1260278 B1 | 10/2007 |
| GB | 960493 A | 6/1964 |
| GB | 1569344 A | 6/1980 |
| GB | 2077289 A | 6/1980 |
| JP | 2001049284 A | 2/2001 |
| JP | 2015514853 A | 5/2015 |
| WO | 9842808 A1 | 10/1998 |
| WO | 2013058261 A1 | 4/2013 |
| WO | 2015091513 A1 | 6/2015 |

OTHER PUBLICATIONS

Van Der Burgt et al., "The Shell Middle Distillate Synthesis Process", 5th Synfuels Worldwide Symposium, Nov. 1985.
Proceedings of The Combustion Institute, vol. 35, 2015, pp. 2967-2974.
International Search Report and Written Opinion received for PCT Patent Application No. PCT/EP2016/061294, dated Jul. 15, 2016, 8 pages.
International Search Report and Written Opinion received for PCT Patent Application No. PCT/EP2016/061251, dated Jun. 27, 2016, 8 pages.

* cited by examiner

*Primary Examiner* — Ellen M McAvoy
*Assistant Examiner* — Ming Cheung Po

(57) ABSTRACT

A fuel composition for powering a combustion engine the composition comprising: a liquid base fuel; and a copolymer obtainable by copolymerizing at least the following monomers: —at least one bicyclic (meth)acrylate ester; —at least one fatty-alkyl (meth)acrylate; —optionally, and preferably, at least one aromatic vinyl monomer; and —optionally other ethylenically unsaturated monomers.

12 Claims, No Drawings

FUEL COMPOSITION

PRIORITY CLAIM

The present application is the National Stage (§ 371) of International Application No. PCT/EP2016/061294, filed May 19, 2016, which claims priority from European Patent Application No. 15178870.0, filed Jul. 29, 2015 and U.S. Patent Application 62/165,232, filed May 22, 2015, incorporated herein by reference.

FIELD OF INVENTION

The present invention relates to fuel compositions containing a certain copolymer. Aspects of the invention also relate to the use of the copolymer in fuel compositions, and to the use of fuel compositions containing the copolymer.

BACKGROUND TO THE INVENTION

Polymers have previously been used for modifying the rheology of a fluid containing the polymer. There is a need for polymers that can be used to adjust the flow and spray characteristics of liquid fuels, such as gasoline and diesel fuels.

Liquid fuels must be vaporized and mixed with air, or oxygen, for effective combustion. As middle distillate or heavier fractions have low vapour pressures, efficient atomization is a particularly critical aspect of spray combustion of such fuels.

Atomization produces fine liquid fuel particles, whose large surface area leads to fast evaporation and thus rapid and efficient combustion. Even with efficient atomization stoichiometric combustion cannot be achieved. Limitation is imposed in this respect by the inability to reach a condition of perfect mixing in the time and size scale of the combustion process and equipment. In order to get complete combustion, therefore, it is necessary to supply excess air to the system.

Excess air, to the extent it provides complete combustion, serves to increase combustion efficiency. However, too much air can lead to a decrease in heat recovery. All of the oxygen not involved in the combustion process as well as all of the nitrogen in the air is heated and thus carries heat out of the stack. Further, the greater the excess air the greater the mass flow through the system and the shorter the time scale for heat transfer. Hence, achieving efficient combustion and heat recovery requires a delicate balance of atomization and excess air coupled with optimized combustion chamber and heat recovery system designs.

GB 1 569 344 relates to the use of polymers, especially poly-isobutylene, to modify fuel properties in an attempt to improve combustion efficiency. A problem with poly-isobutylene was found that it is very difficult to handle, which is exemplified by its glass transition temperature (Tg) of −75° C. Other known polymers such as poly-lauryl methacrylate also suffer from such a low Tg.

Other polymers with higher Tg were found to suffer from insufficient solubility of the polymer in a fuel, as judged visually or via determination of cloud point, making them unsuitable for changing the fuel rheology.

There remains a need for alternative polymers with the ability of modifying the rheology of a petroleum based fuel, that can be handled easily and have adequate solubility in the fuel, and that can enable improved combustion efficiency.

SUMMARY OF THE INVENTION

Therefore one object of the invention is to provide a fuel composition component comprising a polymer with the ability to modify the rheology of a base fuel of the composition, in a manner that can positively influence combustion efficiency in an internal combustion engine run using the fuel.

According to a first aspect of the present invention there is provided a fuel composition for powering a combustion engine, the composition comprising: a liquid base fuel; and a copolymer obtainable by copolymerizing at least the following monomers:
  one or more bicyclic (meth)acrylate esters (a);
  one or more fatty-alkyl (meth)acrylates (b);
  optionally, and preferably, one or more aromatic vinyl monomers (c);
  optionally further ethylenically unsaturated monomers.

In the context of the invention the term '(meth)acrylate' indicates acrylate or methacrylate.

DETAILED DESCRIPTION OF THE INVENTION

The bicyclic (meth)acrylate ester contains a (meth)acryloyl radical bonded to any carbon atom of the bicyclic rings, preferably of the six-membered carbon atom bridged ring; said esters include products like decahydronaphthyl (meth)acrylates, 2-norbornylmethyl methacrylate, and adamantyl (meth)acrylates. Preferred are products according to the general formula (I)

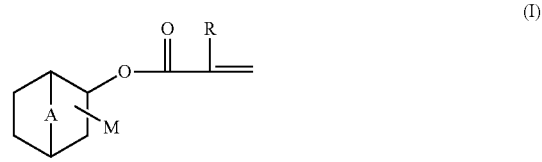

wherein
R is H or —CH$_3$,
A is —CH$_2$—, —CH(CH$_3$)— or —C(CH$_3$)$_2$—, and
one or more M is covalently bonded to any carbon of the bicyclic rings, preferably to a carbon atom of the six-membered ring, and each M is independently selected from the group consisting of hydrogen, halogen, methyl, and methylamino or a plurality thereof.

Non-limiting examples of the bicyclic (meth)acrylate esters include isobornyl (meth)acrylate, bornyl (meth)acrylate, fenchyl (meth)acrylate, isofenchyl (meth)acrylate, norbornyl methacrylate, cis, (endo) 3-methylamino-2-bornyl (meth)acrylate, 1,4,5,6,7,7-hexachlorobicyclo [2.2.1]-hept-5-ene-2-ol methacrylate (HCBOMA) and 1,4,5,6,7,7-hexachlorobicyclo [2.2.1]-hept-5-ene-2 methanol methacrylate (HCBMA), and mixtures of such bicyclic methacrylates. In an embodiment the bicyclic (meth)acrylate ester is not 2-norbornylmethyl methacrylate. In an embodiment the bicyclic (meth)acrylate ester is not norbornyl (meth)acrylate. The chlorinated compounds are less preferred since they can liberate corrosive HCl when burned. A suitable bicyclic methacrylate ester is isobornyl methacrylate. The bicyclic (meth)acrylate esters are known per se and may be prepared in known fashion or may be obtained from commercial sources.

The bicyclic (meth)acrylate is preferably chosen from monomers which, when polymerized, form a homopolymer that is soluble in a liquid fuel, more preferably in diesel fuel.

The fatty-alkyl (meth)acrylates of the invention are compounds wherein a (meth)acryloyl radical is bonded to a fatty alkyl group, herein defined as a $C_8$-$C_{24}$ alkyl group, preferably a $C_{10}$-$C_{22}$ group, which can be linear or branched, substituted or unsubstituted, saturated or unsaturated.

Preferably the fatty-alkyl (meth)acrylate (b) is a $C_8$-$C_{24}$ alkyl (meth)acrylate, wherein the $C_8$-$C_{24}$ alkyl group can be linear or branched, substituted or unsubstituted, saturated or unsaturated.

Examples of the fatty-alkyl (meth)acrylate include decyl (meth)acrylate, isodecyl (meth)acrylate, lauryl (meth)acrylate, methacrylic ester 13.0 (CAS #: 90551-76-1), tetradecyl (meth)acrylate, hexadecyl (meth)acrylate, methacrylic ester 17.4 (CAS #: 90551-84-1), and stearyl (meth)acrylate.

The preferred fatty-alkyl (meth)acrylates are chosen from monomers which, when polymerized, form a homopolymer which is soluble in diesel fuel.

In one embodiment isodecyl (meth)acrylate, lauryl (meth) acrylate, methacrylic ester 13.0 (CAS #: 90551-76-1), methacrylic ester 17.4 (CAS #: 90551-84-1), and/or stearyl (meth)acrylate is used. In another embodiment, lauryl (meth)acrylate and/or methacrylic ester 13.0 (CAS #: 90551-76-1) is used. Suitably lauryl methacrylate is used.

The aromatic vinyl monomer contains a vinyl group bonded to an aromatic group. Examples include styrene, substituted styrene, vinyl naphthalene, divinylbenzene, and mixtures thereof. Preferred substituted styrenes include ortho-, meta- and/or para-alkyl, alkyloxy or halogen substituted styrenes, such as methyl styrene, tert-butyloxy styrene, 2-chlorostyrene and 4-chlorostyrene. Preferably, the aromatic vinyl monomer is styrene.

The aromatic vinyl monomer is preferably chosen from monomers which, when polymerized, form a homopolymer that is not soluble in a liquid fuel, more preferably not soluble in diesel fuel.

Further monomers that may participate in the copolymerization process are ethylenically unsaturated monomers different from the monomers (a), (b) and (c) defined above. Examples of such other monomers include lower alkyl (meth)acrylates, such as methyl (meth)acrylate, ethyl (meth) acrylate, propyl (meth)acrylate, butyl (meth)acrylate, pentyl (meth)(acrylate) and hexyl (meth) acrylate, but also 4-tert-butyl styrene, cationic, nonionic and anionic ethylenically unsaturated monomers known to those skilled in the art, and include, but are not limited to, ethylenically unsaturated acids, such as (meth)acrylic acid, maleic acid, 2-acrylamido-2-methylpropane sulfonic acid, dimethylaminoethyl methacrylate, dimethylaminoethyl acrylate, N-[3-(dimethylamino) propyl] methacrylamide, N-[3-(dimethylamino) propyl] acrylamide, (3-acrylamidopropyl)-trimethyl-ammonium chloride, methacrylamido propyl trimethyl ammonium chloride, (meth)acrylamide, N-alkyl (meth)acrylamides, N-vinyl pyrrolidone, vinyl formamide, vinyl acetamide, and N-vinyl caprolactams.

The copolymer may be synthesized by conventional methods for vinyl addition polymerization known to those skilled in the art, such as but not limited to solution polymerization, precipitation polymerization, and dispersion polymerizations, including suspension polymerization and emulsion polymerization.

In an embodiment the polymer is formed by suspension polymerization, wherein monomers that are insoluble in water or poorly soluble in water are suspended as droplets in water. The monomer droplet suspension is maintained by mechanical agitation and the addition of stabilizers. Surface active polymers such as cellulose ethers, poly(vinyl alcohol-co-vinyl acetate), poly(vinyl pyrrolidone) and alkali metal salts of (meth)acrylic acid containing polymers and colloidal (water insoluble) inorganic powders such as tricalcium phosphate, hydroxyapatite, barium sulfate, kaolin, and magnesium silicates can be used as stabilizers. In addition, small amounts of surfactants such as sodium dodecylbenzene sulfonate can be used together with the stabilizer(s). Polymerization is initiated using an oil soluble initiator. Suitable initiators include peroxides such as benzoyl peroxide, peroxy esters such as tert-butylperoxy-2-ethylhexanoate, and azo compounds such as 2,2'-azobis(2-methyl¬butyro¬nitrile). At the completion of the polymerization, solid polymer product can be separated from the reaction medium by filtration and washed with water, acid, base, or solvent to remove unreacted monomer or free stabilizer.

In another embodiment the polymer is formed by emulsion polymerization, one or more monomers are dispersed in an aqueous phase and polymerization is initiated using a water soluble initiator. The monomers are typically water insoluble or very poorly soluble in water, and a surfactant or soap is used to stabilize the monomer droplets in the aqueous phase. Polymerization occurs in the swollen micelles and latex particles. Other ingredients that might be present in an emulsion polymerization include chain transfer agents such as mercaptans (e.g. dodecyl mercaptan) to control molecular weight and electrolytes to control pH. Suitable initiators include alkali metal or ammonium salts of persulfate such as ammonium persulfate, water-soluble azo compounds such as 2,2'-azobis(2-aminopropane)dihydrochloride, and redox systems such as Fe(II) and cumene hydroperoxide, and tert-butyl hydroperoxide-Fe(II)-sodium ascorbate. Suitable surfactants include anionic surfactants such as fatty acid soaps (e.g. sodium or potassium stearate), sulfates and sulfonates (e.g. sodium dodecyl benzene sulfonate), sulfosuccinates (e.g. dioctyl sodium sulfosuccinate); non-ionic surfactants such as octylphenol ethoxylates and linear and branched alcohol ethoxylates; cationic surfactants such as cetyl trimethyl ammonium chloride; and amphoteric surfactants. Anionic surfactants and combinations of anionic surfactants and non-ionic surfactants are most commonly used. Polymeric stabilizers such as poly(vinyl alcohol-co-vinyl acetate) can also be used as surfactants. The solid polymer product free of the aqueous medium can be obtained by a number of processes including destabilization/coagulation of the final emulsion followed by filtration, solvent precipitation of the polymer from latex, or spray drying of the latex.

One skilled in the art will recognize that certain surfactants and initiator systems could leave residues in the polymer that will be undesirable in the fuel. These might include sulphur containing species, mono- and multivalent metal ions, and halide ions. One can either select alternative surfactants and initiators that will not leave such residues, or choose an isolation/purification process that will remove or minimize any unwanted residues.

For the copolymers used in the present invention the amount of bicyclic (meth)acrylate ester (a) that is used in the monomer composition is greater than 1, 5, 10, or 15 wt %, but suitably 20, 21, 23, 25, or 30 wt % or more, based on the weight of all monomers, because such copolymers were found to have the desired solubility, as determined by the cloud point, in fuels.

In an embodiment, the copolymer is polymerized from:
10 to 95 wt % of the bicyclic (meth)acrylate ester (a);
5 to 80 wt % of the fatty-alkyl (meth)acrylate (b);
0 to 65 wt % of the aromatic vinyl monomer (c); and
0 to 50 wt % of further ethylenically unsaturated monomers (d), not being a monomer (a), (b) or (c).

In another embodiment, the copolymer is polymerized from:
20 to 95 wt % of the bicyclic (meth)acrylate ester (a);
5 to 80 wt % of the fatty-alkyl (meth)acrylate (b);
0 to 65 wt % of the aromatic vinyl monomer (c); and
0 to 50 wt % of further ethylenically unsaturated monomers (d), not being a monomer (a), (b) or (c).

Throughout this document, the weight percentages of the monomer that constitute the copolymer, are based on the total weight of the monomers used, whereby the total weight of the monomers adds up to 100 wt %.

In a further embodiment, the copolymer is polymerized from:
20 to 95 wt % of the bicyclic (meth)acrylate ester (a);
5 to 40 wt % of the fatty-alkyl (meth)acrylate (b);
0 to 65 wt % of the aromatic vinyl monomer (c); and
0 to 50 wt % of further ethylenically unsaturated monomers (d), not being a monomer (a), (b) or (c).

In yet a further embodiment, the copolymer of the invention is polymerized from
40 to 90 wt % of the bicyclic (meth)acrylate ester (a);
10 to 35 wt % of the fatty-alkyl (meth)acrylate (b);
5 to 50 wt % of the aromatic vinyl monomer (c); and
0 to 40 wt % of the further ethylenically unsaturated monomers (d), not being a monomer (a), (b) or (c).

In an additional embodiment the copolymer of the invention is polymerized from
60 to 85 wt % of the bicyclic (meth)acrylate ester (a);
15 to 25 wt % of the fatty-alkyl (meth)acrylate (b);
10 to 35 wt % of the aromatic vinyl monomer (c); and
0 to 30 wt. % of the further ethylenically unsaturated monomers (d) not being a monomer (a), (b) or (c).

In the copolymer used in the invention, and most suitably for each of the embodiments, it is preferred that the sum of monomer (a) and monomer (b) is greater than or equal to 35 wt. %, more preferably, greater than or equal to 40%. In some embodiments the sum of monomer (a) and monomer (b) is greater than or equal to 50%; and in a further embodiment the sum is greater than or equal to 55 wt. % of the total monomer composition.

In the copolymer used in the invention, and most suitably for each of the embodiments which utilise monomers (a) and (c), it is preferred that the sum of monomer (a) and monomer (c) is greater than or equal to 30, more preferably greater than 35 wt. %; even more preferably, greater than or equal to 55%; and most preferably, greater than or equal to 65 wt. % of the total monomer composition. In some embodiments the sum of monomer (a) and monomer (c) is greater than or equal to 20, more suitably greater than or equal to 30 wt %.

Preferably in the copolymer used in the invention, and most suitably for each of the embodiments, the amount of the other ethylenically unsaturated monomers (d) does not exceed 20 wt %, 15 wt %, 9 wt %, or 5 wt % and in certain embodiments, monomers a), b) and c) together constitute 100 wt % of the monomers used to form the polymer.

In a proviso, the copolymers may not be composed of at least one bicyclic (meth)acrylate ester, at least one fatty-alkyl (meth)acrylate, and at least one lower-alkyl (meth)acrylate. Also they may not be copolymers of at least one bicyclic (meth)acrylate ester, at least one fatty-alkyl (meth)acrylate, at least one lower-alkyl (meth)acrylate, and at least one aromatic vinyl monomer, particularly not copolymers wherein the weight percentage of bicyclic (meth)acrylate is more than 15 weight percentage higher than the amount of aromatic vinyl monomer.

It was noted that a homopolymer of styrene is not soluble in B7 diesel fuel, but that a surprisingly large amount of this monomer can be copolymerized with isobornyl methacrylate and fatty-alkyl (meth)acrylate to give highly soluble copolymers. For example, based on the weight fraction of each comonomer in the examples and using a linear mixing model, one would expect cloud points which are significantly higher than the ones actually found and reported herein. In a preferred embodiment the copolymer has a cloud point which is at least 5° C., more preferably at least 10° C. below the value calculated using the linear mixing model.

If so desired, particularly to control the molecular weight and the molecular weight distribution of the polymer and/or to control rheological behaviour of solutions of the polymer, small amounts of divinylbenzene can be used in the mix of monomers. Typically divinylbenzene levels are below 5 wt %, preferably below 2 wt %, more preferably below 1 wt %.

In the copolymer used in the invention, the monomers may be arranged in any fashion, such as in blocks or randomly. Preferably, the copolymer is a randomly arranged copolymer.

In a preferred embodiment herein, the copolymer has a weight averaged molecular weight (Mw) from 400,000 to 50,000,000 Dalton.

The weight averaged molecular weight (Mw) of the copolymer used in the invention, when measured in accordance with GPC-MALS method a) of the experimental section, is preferably at least 400,000 Dalton (D), in an embodiment at least 500,000, 600,000, 700,000, 800,000, 900,000, and/or at least 1,000,000 D. In another embodiment the Mw of the copolymer used in the invention is at least 1,500,000, suitably, 2,000,000 D or more. The upper molecular weight is determined by the solubility in the fluid in which it is intended to be used. Suitably the Mw is 50,000,000 or less, preferably less than 25,000,000. In an embodiment the Mw is 20,000,000, 15,000,000, 10,000,000, 7,500,000, 6,000,000, and/or 5,000,000 or less D. Polymers with a composition defined for use in the invention and a molecular weight of 1,000,000 to 50,000,000, preferably 2,000,000 to 25,000,000 D were found to be useful at low concentrations, which made them particularly suitable for application in fuel, particularly for use in additive packages for fuel. The polydispersity index (PDI), i.e. Mw/Mn, of the copolymer used in the invention was found not to be critical and is suitably in the range of from 1, or 2, or 3, up to 10, or 8, or 6. In an embodiment the PDI is from 1 to 5 or from 1.5 to 4.

The glass transition temperature of the copolymer used in the invention is preferably in the range of from 50 to 190° C., more preferably from 65 to 150° C., and in another embodiment from 95 to 130° C., as determined by Differential Scanning calorimetry (DSC). Herein the glass transition temperatures (Tg) were measured using a DSC Q200 (TA Instruments, New Castle, Del.) with the following program:
1) Start DSC run with isothermal of 15 min at 20 degree C.;
2) Ramp the temperature at 10 degree C./min to roughly 20 degree C. above the Tg of the material;
3) Run isothermal at that temperature for 5 min;
4) Ramp temperature down from 20 degree C. above Tg at 20 degree C./min to 20 degree C.;
5) Run isothermal at 20 degree C. for 5 min;
6) Start the Modulate mode with the process condition of +/−1.280 degree C. for every 60 second;
7) Ramp the temperature at 2 degree C./min to 180 degree C.

The composition of the polymer can be reliably estimated from the relative amounts of the monomers fed into the polymerization. Alternatively, the composition of the copolymer is suitably determined from carbon-13 NMR spectra using a Varian MR-400 MHz and/or an Agilent DD2 MR 500 MHz NMR spectrometer.

The polymer of the invention is advantageously added to a petroleum based fuel suitable for running combustion engines, such as fuels conventionally known as gasoline and diesel fuels. The polymer is preferably added to the fuel in an amount effective to obtain a combustion efficiency improving effect. Typically, the polymer used in the invention is added to the fuel to achieve concentrations below 5000 ppm (parts per million by weight), such as from 5, from 10, from 50, from 100 or from 500 ppm, preferably up to 3000 or 1000 ppm. The term "ppm" equates to one mg per kg.

The copolymers used in the invention have the advantages that (1) they are better suited to adjust the flow and spray characteristics of a petroleum based fuel than conventional polymers; (2) the Tg of the copolymers is high enough to allow handling of the polymer as solids, and (3) they can be used in additive packages for use in fuel.

It is noted that the copolymers used herein may also be added to fuel composition to modify the rheology of said fuels. Suitably, the viscosity of the fuel compositions is increased by dissolution of less than 1% w/w, preferably less than 0.5% w/w, of the copolymer, based on the weight of the total fuel composition.

Herein a polymer is considered to be soluble when at least a 2.0 wt % solution of the polymer in a diesel fuel or a diesel base fuel at 25° C. can be made, if necessary after heating. Preferably a 2.0 wt % solution of the polymer in diesel at 8° C. can be made. Preferably the copolymer of any embodiment herein, when analysed as described below in the experimental section, shows a cloud point below 25° C., more preferably a cloud point below 15° C., and even more preferably a cloud point below 5° C.

In an embodiment, the fuel composition of the invention contains: a copolymer component consisting of, or comprising, one or more copolymers obtainable by copolymerizing at least the following monomers:
  at least one bicyclic (meth)acrylate ester,
  at least one fatty-alkyl (meth)acrylate,
  optionally at least one aromatic vinyl monomer, and
  optionally other ethylenically unsaturated monomers.

In an embodiment of the fuel composition of the invention, the copolymer or said copolymer component is preferably present in the fuel composition in a total amount in the range of from 10 ppm to 100 ppm, more preferably in the range of from 25 ppm to 80 ppm based on the total weight of the fuel composition.

Preferably, said copolymer component consists of one or more copolymers as defined above.

The term "consisting" wherever used herein also embraces "consisting substantially", but may optionally be limited to its strict meaning of "consisting entirely".

The copolymer component is to be understood herein as a component added to the base fuel. Preferably, the copolymer component may be, or be taken to be, the sole source of the copolymer(s) that it consists of in the composition, but this is not essential.

In some embodiments of the invention, the copolymer component may comprise a small amount of impurities, for example by-products of copolymer synthesis that have no substantive effect on the overall properties of the copolymer component. Such impurities may, for example, be present in the copolymer component in an amount of at most about 3 wt %. In embodiments of the invention, such impurities up to 3 wt % may be considered part of the copolymer component, in which case the component consists substantially of the copolymer compounds.

The base fuel may be a liquid base fuel of any suitable type.

The base fuel may be at least partly fossil fuel derived, such as derived from petroleum, coal tar or natural gas.

The base fuel may be at least partly bioderived. Bio-derived components comprise at least about 0.1 dpm/gC of carbon-14. It is known in the art that carbon-14, which has a half-life of about 5700 years, is found in biologically derived materials but not in fossil fuels. Carbon-14 levels can be determined by measuring its decay process (disintegrations per minute per gram carbon or dpm/gC) through liquid scintillation counting.

The base fuel may be at least partly synthetic: for instance derived by a Fischer-Tropsch synthesis.

Conveniently, the base fuel may be derived in any known manner, e.g. from a straight-run stream, synthetically-produced aromatic hydrocarbon mixtures, thermally or catalytically cracked hydrocarbons, hydrocracked petroleum fractions, catalytically reformed hydrocarbons or mixtures of these.

In an embodiment, the base fuel is a distillate.

Typically, the base fuel may be a hydrocarbon base fuel, i.e. comprise, or consist of, hydrocarbons. However, the base fuel may also comprise or consist of oxygenates, for example alcohols or esters, as is known in the art.

The base fuel may itself comprise a mixture of two or more different components, and/or be additivated, e.g. as described below.

The copolymer in the fuel offers particular advantages in the context of middle distillate or heavier base fuels. In an embodiment, the base fuel comprises a middle distillate, for example a diesel and/or kerosene base fuel.

Preferably, the base fuel may be a diesel base fuel. The diesel base fuel may be any fuel component, or mixture thereof, which is suitable and/or adapted for use in a diesel fuel composition and therefore for combustion within a compression ignition (diesel) engine. It will typically be a middle distillate base fuel.

A diesel base fuel will typically boil in the range from 150 or 180 to 370 or 410° C. (ASTM D86 or EN ISO 3405), depending on grade and use.

The diesel base fuel may be derived in any suitable manner. It may be at least partly petroleum derived. It may be at least partly obtained by distillation of a desired range of fractions from a crude oil. It may be at least partly synthetic: for instance it may be at least partly the product of a Fischer-Tropsch condensation. It may be at least partly derived from a biological source.

A petroleum derived diesel base fuel will typically include one or more cracked products, obtained by splitting heavy hydrocarbons. A petroleum derived gas oil may for instance be obtained by refining and optionally (hydro)processing a crude petroleum source. The diesel base fuel may comprise a single gas oil stream obtained from such a refinery process or a blend of several gas oil fractions obtained in the refinery process via different processing routes. Examples of such gas oil fractions are straight run gas oil, vacuum gas oil, gas oil as obtained in a thermal cracking process, light and heavy cycle oils as obtained in a fluid catalytic cracking unit and gas oil as obtained from a hydrocracker unit. Optionally a petroleum derived gas oil may comprise some petroleum derived kerosene fraction.

Preferably such fractions contain components having carbon numbers in the range 5 to 40, more preferably 5 to 31, yet more preferably 6 to 25, most preferably 9 to 25, and such fractions preferably have a density at 15° C. of 650 to 1000 kg/m³, a kinematic viscosity at 20° C. of 1 to 80 mm²/s, and a boiling range of 150 to 410° C.

Such gas oils may be processed in a hydrodesulphurisation (HDS) unit so as to reduce their sulphur content to a level suitable for inclusion in a diesel fuel composition.

The diesel base fuel may comprise or consist of a Fischer-Tropsch derived diesel fuel component, typically a Fischer-Tropsch derived gas oil.

In the context of the present invention, the term "Fischer-Tropsch derived" means that a material is, or derives from, a synthesis product of a Fischer-Tropsch condensation process. The term "non-Fischer-Tropsch derived" may be interpreted accordingly. A Fischer-Tropsch derived fuel or fuel component will therefore be a hydrocarbon stream in which a substantial portion, except for added hydrogen, is derived directly or indirectly from a Fischer-Tropsch condensation process.

Fischer-Tropsch fuels may for example be derived from natural gas, natural gas liquids, petroleum or shale oil, petroleum or shale oil processing residues, coal or biomass.

The Fischer Tropsch reaction converts carbon monoxide and hydrogen into longer chain, usually paraffinic, hydrocarbons:

$$n(CO+2H_2) = (-CH_2-)_n + nH_2O + heat,$$

in the presence of an appropriate catalyst and typically at elevated temperatures (e.g. 125 to 300° C., preferably 175 to 250° C.) and/or pressures (e.g. 0.5 to 10 MPa, preferably 1.2 to 5 MPa). Hydrogen:carbon monoxide ratios other than 2:1 may be employed if desired.

The carbon monoxide and hydrogen may themselves be derived from organic, inorganic, natural or synthetic sources, typically either from natural gas or from organically derived methane.

A Fischer-Tropsch derived diesel base fuel of use in the present invention may be obtained directly from the refining or the Fischer-Tropsch reaction, or indirectly for instance by fractionation or hydrotreating of the refining or synthesis product to give a fractionated or hydrotreated product. Hydrotreatment can involve hydrocracking to adjust the boiling range (see e.g. GB B 2077289 and EP-A-0147873) and/or hydroisomerisation which can improve cold flow properties by increasing the proportion of branched paraffins.

Typical catalysts for the Fischer-Tropsch synthesis of paraffinic hydrocarbons comprise, as the catalytically active component, a metal from Group VIII of the periodic table of the elements, in particular ruthenium, iron, cobalt or nickel. Suitable such catalysts are described for instance in EP-A-0583836.

An example of a Fischer-Tropsch based process is the Shell™ "Gas-to-liquids" or "GtL" technology (formerly known as the SMDS (Shell Middle Distillate Synthesis) and described in "The Shell Middle Distillate Synthesis Process", van der Burgt et al, paper delivered at the 5th Synfuels Worldwide Symposium, Washington D.C., November 1985, and in the November 1989 publication of the same title from Shell International Petroleum Company Ltd, London, UK). This process produces middle distillate range products by conversion of a natural gas into a heavy long chain hydrocarbon (paraffin) wax which can then be hydroconverted and fractionated.

For use in the present invention, a Fischer-Tropsch derived fuel component is preferably any suitable component derived from a gas to liquid synthesis (hereinafter a GtL component), or a component derived from an analogous Fischer-Tropsch synthesis, for instance converting gas, biomass or coal to liquid (hereinafter an XtL component). A Fischer-Tropsch derived component is preferably a GtL component. It may be a BtL (biomass to liquid) component. In general a suitable XtL component may be a middle distillate fuel component, for instance selected from kerosene, diesel and gas oil fractions as known in the art; such components may be generically classed as synthetic process fuels or synthetic process oils. Preferably an XtL component for use as a diesel fuel component is a gas oil.

The diesel base fuel may comprise or consist of a bio-derived fuel component (biofuel component). Such fuel components may have boiling points within the normal diesel boiling range, and will have been derived—whether directly or indirectly—from biological sources.

It is known to include fatty acid alkyl esters (FAAEs), in particular fatty acid methyl esters (FAAEs), in diesel fuel compositions. An example of an FAAE included in diesel fuels is rapeseed methyl ester (RME). FAAEs are typically derivable from biological sources and may be added for a variety of reasons, including to reduce the environmental impact of the fuel production and consumption process or to improve lubricity. The FAAE will typically be added to the fuel composition as a blend (i.e. a physical mixture), conveniently before the composition is introduced into an internal combustion engine or other system which is to be run on the composition. Other fuel components and/or fuel additives may also be incorporated into the composition, either before or after addition of the FAAE and either before or during use of the composition in a combustion system. The amount of FAAE added will depend on the natures of any other base fuels and FAAE in question and on the target Cloud Point.

FAAEs, of which the most commonly used in the present context are the methyl esters, are already known as renewable diesel fuels (so-called "biodiesel" fuels). They contain long chain carboxylic acid molecules (generally from 10 to 22 carbon atoms long), each having an alcohol molecule attached to one end. Organically derived oils such as vegetable oils (including recycled vegetable oils) and animal fats (including fish oils) can be subjected to a transesterification process with an alcohol (typically a Ci to C5 alcohol) to form the corresponding fatty esters, typically monoalkylated. This process, which is suitably either acid- or base-catalysed, such as with the base KOH, converts the triglycerides contained in the oils into fatty acid esters and free glycerol, by separating the fatty acid components of the oils from their glycerol backbone. FAAEs can also be prepared from used cooking oils, and can be prepared by standard esterification from fatty acids.

In the present invention, the FAAE may be any alkylated fatty acid or mixture of fatty acids. Its fatty acid component(s) are preferably derived from a biological source, more preferably a vegetable source. They may be saturated or unsaturated; if the latter, they may have one or more, preferably up to 6, double bonds. They may be linear or branched, cyclic or polycyclic. Suitably they will have from 6 to 30, preferably 10 to 30, more suitably from 10 to 22 or from 12 to 24 or from 16 to 18, carbon atoms including the acid group(s) —CO₂H.

The FAAE will typically comprise a mixture of different fatty acid esters of different chain lengths, depending on its source.

The FAAE is preferably derived from a natural fatty oil, for instance tall oil. The FAAE is preferably a C1 to C5 alkyl ester, more preferably a methyl, ethyl, propyl (suitably iso-propyl) or butyl ester, yet more preferably a methyl or ethyl ester and in particular a methyl ester. It may suitably be the methyl ester of tall oil. In general it may be either natural or synthetic, refined or unrefined ("crude").

The FAAE may contain impurities or by-products as a result of the manufacturing process.

The FAAE suitably complies with specifications applying to the rest of the fuel composition, and/or to another base fuel to which it is added, bearing in mind the intended use to which the composition is to be put (for example, in which geographical area and at what time of year). In particular, the FAAE preferably has a flash point (IP 34) of greater than 101° C.; a kinematic viscosity at 40° C. (IP 71) of 1.9 to 6.0 $mm^2/s$, preferably 3.5 to 5.0 $mm^2/s$; a density from 845 to 910 $kg/m^3$, preferably from 860 to 900 $kg/m^3$, at 15° C. (IP 365, EN ISO 12185 or EN ISO 3675); a water content (IP 386) of less than 500 ppm; a T95 (the temperature at which 95% of the fuel has evaporated, measured according to IP 123) of less than 360° C.; an acid number (IP 139) of less than 0.8 mgKOH/g, preferably less than 0.5 mgKOH/g; and an iodine number (IP 84) of less than 125, preferably less than 120 or less than 115, grams of iodine (I2) per 100 g of fuel. It also preferably contains (e.g. by gas chromatography (GC)) less than 0.2% w/w of free methanol, less than 0.02% w/w of free glycerol and greater than 96.5% w/w esters. In general it may be preferred for the FAAE to conform to the European specification EN 14214 for fatty acid methyl esters for use as diesel fuels.

Two or more FAAEs may be present in the base fuel of the present invention.

Preferably, the fatty acid alkyl ester concentration in the base fuel or total fuel composition accords with one or more of the following parameters: (i) at least 1% v; (ii) at least 2% v; (iii) at least 3% v; (iv) at least 4% v; (v) at least 5% v; (vi) up to 6% v; (vii) up to 8% v; (viii) up to 10% v, (xi) up to 12% v, (x) up to 35% v, with ranges having features (i) and (x), (ii) and (ix), (iii) and (viii), (iv) and (vii), and (v) and (vi) respectively being progressively more preferred. The range having features (v) and (viii) is also preferred.

The diesel base fuel may suitably comply with applicable current standard diesel fuel specification(s) as set out below for the diesel fuel composition.

The fuel composition of the present invention may in particular be a diesel fuel composition. It may be used in, and/or may be suitable and/or adapted and/or intended for use in, any type of compression ignition (diesel) engine. It may in particular be an automotive fuel composition.

The diesel fuel composition may comprise standard diesel fuel components. It may include a major proportion of a diesel base fuel, for instance of the type described above. A "major proportion" means typically 85% w/w or greater based on the overall composition, more suitably 90 or 95% w/w or greater, most preferably 98 or 99 or 99.5% w/w or greater.

In a diesel fuel composition according to the invention, the base fuel may itself comprise a mixture of two or more diesel fuel components of the types described above.

The fuel composition may suitably comply with applicable current standard diesel fuel specification(s) such as for example EN 590 (for Europe) or ASTM D975 (for the USA). By way of example, the overall composition may have a density from 820 to 845 $kg/m^3$ at 15° C. (ASTM D4052 or EN ISO 3675); a T95 boiling point (ASTM D86 or EN ISO 3405) of 360° C. or less; a measured cetane number (ASTM D613) of 40 or greater, ideally of 51 or greater; a kinematic viscosity at 40° C. (VK40) (ASTM D445 or EN ISO 3104) from 2 to 4.5 centistokes ($mm^2/s$); a flash point (ASTM D93 or EN ISO 2719) of 55° C. or greater; a sulphur content (ASTM D2622 or EN ISO 20846) of 50 mg/kg or less; a cloud point (ASTM D2500/IP 219/ISO 3015) of less than −10° C.; and/or a polycyclic aromatic hydrocarbons (PAH) content (EN 12916) of less than 11% w/w. It may have a lubricity, measured using a high frequency reciprocating rig for example according to ISO 12156 and expressed as a "HFRR wear scar", of 460 μm or less.

Relevant specifications may however differ from country to country and from year to year, and may depend on the intended use of the composition. Moreover the composition may contain individual fuel components with properties outside of these ranges, since the properties of an overall blend may differ, often significantly, from those of its individual constituents.

A diesel fuel composition prepared according to the invention suitably contains no more than 5000 ppm (parts per million by weight) of sulphur, typically from 2000 to 5000 ppm, or from 1000 to 2000 ppm, or alternatively up to 1000 ppm. The composition may for example be a low or ultra-low sulphur fuel, or a sulphur free fuel, for instance containing at most 500 ppm, preferably no more than 350 ppm, most preferably no more than 100 or 50 or even 10 ppm, of sulphur.

A fuel composition according to the invention, or a base fuel used in such a composition, may be additivated (additive-containing) or unadditivated (additive-free). If additivated, e.g. at the refinery, it will contain minor amounts of one or more additives selected for example from cetane boost additives, anti-static agents, pipeline drag reducers, flow improvers (e.g. ethylene/vinyl acetate copolymers or acrylate/maleic anhydride copolymers), lubricity additives, antioxidants and wax anti-settling agents. Thus, the composition may contain a minor proportion (preferably 1% w/w or less, more preferably 0.5% w/w (5000 ppm) or less and most preferably 0.2% w/w (2000 ppm) or less), of one or more fuel additives, in addition to the copolymer.

The composition may for example contain a detergent. Detergent-containing diesel fuel additives are known and commercially available. Such additives may be added to diesel fuels at levels intended to reduce, remove or slow the build-up of engine deposits. Examples of detergents suitable for use in fuel additives for the present purpose include polyolefin substituted succinimides or succinamides of polyamines, for instance polyisobutylene succinimides or polyisobutylene amine succinamides, aliphatic amines, Mannich bases or amines and polyolefin (e.g. polyisobutylene) maleic anhydrides. Succinimide dispersant additives are described for example in GB-A-960493, EP-A-0147240, EP-A-0482253, EP-A-0613938, EP-A-0557516 and WO-A-98/42808. Particularly preferred are polyolefin substituted succinimides such as polyisobutylene succinimides.

A fuel additive mixture useable in a fuel composition prepared according to the invention may contain other components in addition to the detergent. Examples are lubricity enhancers; dehazers, e.g. alkoxylated phenol formaldehyde polymers; anti-foaming agents (e.g. polyether-modified polysiloxanes); ignition improvers (cetane improvers) (e.g. 2-ethylhexyl nitrate (EHN), cyclohexyl nitrate, di-tert-butyl peroxide and those disclosed in U.S. Pat. No. 4,208,190 at column 2, line 27 to column 3, line 21); anti-rust agents (e.g. a propane-1,2-diol semi-ester of tetrapropenyl succinic acid, or polyhydric alcohol esters of a succinic acid derivative, the succinic acid derivative having on at least one of its alpha-carbon atoms an unsubstituted or substituted aliphatic hydrocarbon group containing from 20 to 500 carbon atoms, e.g. the pentaerythritol diester of polyisobutylene-substituted succinic acid); corrosion inhibitors; reodorants; anti-wear additives; antioxidants (e.g. phenolics such as 2,6-di-tert-butylphenol, or phenylenediamines such as N,N'-di-sec-butyl-p-phenylenediamine); metal deactivators; combustion improvers; static dissipator additives; cold flow improvers; and wax anti-settling agents.

Such a fuel additive mixture may contain a lubricity enhancer, especially when the fuel composition has a low (e.g. 500 ppm or less) sulphur content. In the additivated fuel composition, the lubricity enhancer is conveniently present at a concentration of less than 1000 ppm, preferably between 50 and 1000 ppm, more preferably between 70 and 1000 ppm. Suitable commercially available lubricity enhancers include ester- and acid-based additives.

It may also be preferred for the fuel composition to contain an anti-foaming agent, more preferably in combination with an anti-rust agent and/or a corrosion inhibitor and/or a lubricity enhancing additive.

Unless otherwise stated, the (active matter) concentration of each such additive component in the additivated fuel composition is preferably up to 10000 ppm, more preferably in the range of 0.1 to 1000 ppm, advantageously from 0.1 to 300 ppm, such as from 0.1 to 150 ppm.

The (active matter) concentration of any dehazer in the fuel composition will preferably be in the range from 0.1 to 20 ppm, more preferably from 1 to 15 ppm, still more preferably from 1 to 10 ppm, advantageously from 1 to 5 ppm. The (active matter) concentration of any ignition improver present will preferably be 2600 ppm or less, more preferably 2000 ppm or less, conveniently from 300 to 1500 ppm. The (active matter) concentration of any detergent in the fuel composition will preferably be in the range from 5 to 1500 ppm, more preferably from 10 to 750 ppm, most preferably from 20 to 500 ppm.

If desired one or more additive components, such as those listed above, may be co-mixed—preferably together with suitable diluent(s)—in an additive concentrate, and the additive concentrate may then be dispersed into a base fuel or fuel composition. The copolymer may, in accordance with the present invention, be incorporated into such an additive formulation.

The additive formulation or additive package is suitably a dissolution of the additive components in a solvent, because the controlled pre-dissolution of the copolymer allows easier mixing with/dissolution in a fuel.

In the diesel fuel composition, the fuel additive mixture will for example contain a detergent, optionally together with other components as described above, and a diesel fuel-compatible diluent, which may be a mineral oil, a solvent such as those sold by Shell companies under the trade mark "SHELLSOL", a polar solvent such as an ester and, in particular, an alcohol, e.g. hexanol, 2-ethylhexanol, decanol, isotridecanol and alcohol mixtures such as those sold by Shell companies under the trade mark "LINEVOL", especially LINEVOL 79 alcohol which is a mixture of C7-9 primary alcohols, or a C12-14 alcohol mixture which is commercially available.

The total content of the additives in the fuel composition may be suitably between 0 and 10000 ppm and preferably below 5000 ppm.

In this specification, amounts (concentrations, % v/v, ppm, % w/w) of components are of active matter, i.e. exclusive of volatile solvents/diluent materials.

The present invention may be used to give performance benefits similar to an increased cetane number of the fuel composition. The invention may additionally or alternatively be used to adjust any property of the fuel composition which is equivalent to or associated with cetane number, for example to improve the combustion performance of the composition (e.g. to shorten ignition delays, to facilitate cold starting and/or to reduce incomplete combustion and/or associated emissions in a fuel-consuming system running on the fuel composition) and/or to improve combustion noise, and/or to improve power.

In principle, the base fuel may also comprise or consist of a type of liquid base fuel other than a diesel base fuel.

Suitably, the base fuel may comprise or consists of a heavy distillate fuel oil. In an embodiment, the base fuel comprises an industrial gas oil or a domestic heating oil.

Suitably, the base fuel may comprise or consist of a kerosene base fuel, a gasoline base fuel or mixtures thereof.

Kerosene base fuels will typically have boiling points within the usual kerosene range of 130 to 300° C., depending on grade and use. They will typically have a density from 775 to 840 kg/m$^3$, preferably from 780 to 830 kg/m$^3$, at 15° C. (e.g. ASTM D4502 or IP 365). They will typically have an initial boiling point in the range 130 to 160° C. and a final boiling point in the range 220 to 300° C. Their kinematic viscosity at −20° C. (ASTM D445) might suitably be from 1.2 to 8.0 mm$^2$/s.

A gasoline base fuel may be any fuel component, or mixture thereof, which is suitable and/or adapted for use in a gasoline fuel composition and therefore for combustion within a spark ignition (petrol) engine.

Typically, the gasoline base fuel is a liquid hydrocarbon distillate fuel component, or mixture of such components, containing hydrocarbons which boil in the range from 0 to 250° C. (ASTM D86 or EN ISO 3405) or from 20 or 25 to 200 or 230° C. The optimal boiling ranges and distillation curves for such base fuels will typically vary according to the conditions of their intended use, for example the climate, the season and any applicable local regulatory standards or consumer preferences.

The gasoline base fuel may be derived from, for example, petroleum, coal tar, natural gas or wood, in particular petroleum. It may be synthetic: for instance it may be the product of a Fischer-Tropsch synthesis.

A gasoline base fuel will typically have a research octane number (RON) (ASTM D2699 or EN 25164) of 80 or greater, or of 85 or 90 or 93 or 94 or 95 or 98 or greater, for example from 80 to 110 or from 85 to 115 or from 90 to 105 or from 93 to 102 or from 94 to 100. It will typically have a motor octane number (MON) (ASTM D2700 or EN 25163) of 70 or greater, or of 75 or 80 or 84 or 85 or greater, for example from 70 to 110 or from 75 to 105 or from 84 to 95.

A gasoline base fuel suitably has a low or ultra low sulphur content, for instance at most 1000 ppm (parts per million by weight) of sulphur, or no more than 500 ppm, or no more than 100 ppm, or no more than 50 or even 10 ppm. It also suitably has a low total lead content, such as at most 0.005 g/l; in an embodiment it is lead free ("unleaded"), i.e. having no lead compounds in it.

A gasoline base fuel might typically have a density from 0.720 to 0.775 kg/m$^3$ at 15° C. (ASTM D4052 or EN ISO 3675). For use in a summer grade gasoline fuel, a base fuel might typically have a vapour pressure at 37.8° C. (DVPE) of from 45 to 70 kPa or from 45 to 60 kPa (EN 13016-1 or ASTM D4953-06). For use in a winter grade fuel it might typically have a DVPE of from 50 to 100 kPa, for example from 50 to 80 kPa or from 60 to 90 kPa or from 65 to 95 kPa or from 70 to 100 kPa.

The gasoline base fuel may comprise or consist of one or more biofuel components, which are derived from biological sources. For example, it may comprise one or more oxygenates as additional fuel components, in particular alcohols or ethers having boiling points below 210° C. Examples of suitable alcohols include C1 to C4 or C1 to C3 aliphatic alcohols, in particular ethanol. Suitable ethers include C5 or C5+ ethers. The base fuel may include one or more gasoline fuel additives, of the type which are well known in the art. It may be a reformulated gasoline base fuel, for example one which has been reformulated so as to accommodate the addition of an oxygenate such as ethanol.

In and embodiment, the fuel composition of the present invention is a gasoline fuel composition.

The gasoline fuel composition can be suitable and/or adapted for use in a spark ignition (petrol) internal combustion engine. It may in particular be an automotive fuel composition.

It may for example include a major proportion of a gasoline base fuel as described above. A "major proportion" in this context means typically 85% w/w or greater based on the overall fuel composition, more suitably 90 or 95% w/w or greater, most preferably 98 or 99 or 99.5% w/w or greater.

The gasoline fuel composition may suitably comply with applicable current standard gasoline fuel specification(s) such as for example EN 228 in the European Union. By way of example, the overall formulation may have a density from 0.720 to 0.775 kg/m$^3$ at 15° C. (ASTM D4052 or EN ISO 3675); a final boiling point (ASTM D86 or EN ISO 3405) of 210° C. or less; a RON (ASTM D2699) of 95.0 or greater; a MON (ASTM D2700) of 85.0 or greater; an olefinic hydrocarbon content of from 0 to 20% v/v (ASTM D1319); and/or an oxygen content of from 0 to 5% w/w (EN 1601).

Relevant specifications may however differ from country to country and from year to year, and may depend on the intended use of the composition. Moreover the composition may contain individual fuel components with properties outside of these ranges, since the properties of an overall blend may differ, often significantly, from those of its individual constituents.

The fuel composition may be prepared by simple blending of its components in any suitable order. From a second aspect, the invention provides a method of blending the fuel composition, the method comprising blending the copolymer with the base fuel. The method may comprise agitating the composition to disperse or dissolve the copolymer in the base oil.

In embodiments, the present invention may be used to produce at least 1,000 litres of the copolymer-containing fuel composition, or at least 5,000 or 10,000 or 20,000 or 50,000 litres.

According to a third aspect of the invention, there is provided the use of the copolymer in the fuel composition for the purpose of one or more of:
(i) aiding atomisation of the fuel composition;
(ii) decreasing the ignition delay of the composition; and
(iii) improving the power output of a combustion ignition engine run on the composition.

In the context of the present invention, "use" of the copolymer in a fuel composition means incorporating the copolymer into the composition, typically as a blend (i.e. a physical mixture) with one or more other fuel components, for example a base fuel and optionally one or more fuel additives, preferably a diesel base fuel and optionally one or more diesel fuel additives. The copolymer will conveniently be incorporated before the composition is introduced into an engine or other system which is to be run on the composition. Instead or in addition, the use of the copolymer may involve running a fuel-consuming system, typically an internal combustion engine, on a fuel composition containing the copolymer, typically by introducing the composition into a combustion chamber of an engine. It may involve running a vehicle which is driven by a fuel-consuming system, on a fuel composition containing the copolymer. In such cases the fuel composition is suitably a diesel fuel composition and the engine is suitably a compression ignition (diesel) engine. "Use" of the copolymer in the ways described above may also embrace supplying the copolymer together with instructions for its use in a fuel composition, in particular a diesel fuel composition. The copolymer may itself be supplied as part of a composition which is suitable for and/or intended for use as a fuel additive.

A fourth aspect of the invention provides for the use of a fuel composition according to the first aspect of the invention for the purpose of one or more of:
(i) aiding fuel atomisation;
(ii) decreasing ignition delay; and
(iii) improving the power output of a combustion ignition engine run on the composition.

The combustion engine is preferably an internal combustion engine, and more preferably the fuel composition is a diesel fuel composition and the combustion engine is compression ignition (diesel) engine.

The purposes of aiding, decreasing and improving may in particular be achieved relative to a fuel composition substantially free from said copolymer.

A fuel composition prepared or used according to the invention may be marketed with an indication that it benefits from an improvement, for example a decrease in ignition delay, and/or an improvement in power. The marketing of such a composition may comprise an activity selected from (a) providing the composition in a container that comprises the relevant indication; (b) supplying the composition with product literature that comprises the indication; (c) providing the indication in a publication or sign (for example at the point of sale) that describes the composition; and (d) providing the indication in a commercial which is aired for instance on the radio, television or internet. The improvement may optionally be attributed, in such an indication, at least partly to the presence of the copolymer. The use of the composition may involve assessing the relevant property (for example the ignition delay, and/or the power output) derived from the composition during or after its preparation. It may involve assessing the relevant property both before and after incorporation of the copolymer, for example so as to confirm that the copolymer contributes to the relevant improvement in the composition.

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Other features of the invention will become apparent from the following examples. Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith. For example, for the avoidance of doubt, the optional and preferred features of the fuel composition, the base fuel or the copolymer apply to all aspects of the invention in which the fuel composition, the base fuel or the copolymer are mentioned.

Moreover unless stated otherwise, any feature disclosed herein may be replaced by an alternative feature serving the same or a similar purpose.

Where upper and lower limits are quoted for a property, for example for the concentration of a fuel component, then a range of values defined by a combination of any of the upper limits with any of the lower limits may also be implied.

In this specification, references to fuel and fuel component properties are—unless stated otherwise—to properties measured under ambient conditions, i.e. at atmospheric pressure and at a temperature from 16 to 22 or 25° C., or from 18 to 22 or 25° C., for example about 20° C.

The present invention will now be further described with reference to the following non-limiting examples.

EXAMPLES

A series of exemplary inventive copolymers and comparative polymers were made using different combinations of isobornyl methacrylate, lauryl methacrylate, methacrylic ester C13.0, and other monomers. Isobornyl methacrylate was obtained from Sigma-Aldrich or Evonik (VISIOMER® terra IBOMA). Methacrylic ester 13.0 was obtained from Evonik (VISIOMER® terra C13-MA). Styrene and both lauryl and isobutyl methacrylate were obtained from Sigma-Aldrich.

Molecular Weight:

Two different methods were used to determine polymer molecular weight.

Method A:

Molecular weight was determined by GPC-MALS, 40° C. Quantitation was a semi-batch mode by analysis using a guard column only. Samples were prepared by dissolving about 10 mg in 10 mL of tetrahydrofuran (mobile phase). Samples were further diluted with tetrahydrofuran as needed.

Column: Phenogel Guard 10^6A (50 mm×7.8 mm);

Flow Rate: 0.5 ml/min THF;

Injection: 50 μl;

Column temperature: 40° C.;

Detection: Wyatt® Dawn Heleos 18 angle MALS 633 nm and

Wyatt Optilab T-REX Refractive Index Detector;

Quantitation: Zimm or Debye $1^{st}$ order of $2^{nd}$ order, with 5 to 18 angles.

Method B:

Molecular weight was determined by GPC-MALS. Samples were prepared by dissolving about 10 mg in 10 mL of tetrahydrofuran (mobile phase).

Column: 30 cm×4.6 mm 10.0 μm Phenogel 10^5 A—nominal limit 1 Million;

Mobile Phase: Stabilized Tetrahydrofuran;

Flow Rate: 0.40 ml/min;

Injection: 100 μl;

Column Temperature: 40° C.;

Detection: RI and LS with Wyatt Heleos MALS.

Synthesis Example S1. Preparation of Copolymer by Emulsion Polymerization Process Materials:

| Initial Charge: | |
|---|---|
| Deionized water | 632.8 g |
| Aerosol ® OT-75 PG (sodium dioctyl sulfosuccinate, 75% in propylene glycol and water; available from Cytec) | 11.1 g |
| 1% NaOH | As needed |
| Co-solvent: | |
| Acetone | 139.6 g |
| Monomer mix: | |
| Isobornyl methacrylate | 117.0 g |
| Styrene | 117.3 g |
| Methacrylic Ester 13.0 (VISIOMER® terra C13-MA, available from Evonik) | 66.1 g |
| Oxidant solution: | |
| t-Butyl hydroperoxide, 70% | 0.0400 g |
| Deionized water | 3.75 g |
| Reductant solution: | |
| Deionized water | 7.50 g |
| Sodium ascorbate | 0.0739 g |
| Iron (II) sulfate heptahydrate, 0.25% in deionized water | 0.60 g |

Polymerization Procedure

A 2 L, 4-neck round bottom flask is equipped with an overhead mechanical stirrer, a Y-tube equipped with a condenser and nitrogen purge line, a thermometer, and a stopper. To the flask were charged deionized water and surfactant. The pH was checked and found to be within the desired range of 4 to 5 so no pH adjustment was made. A sub-surface nitrogen purge was then initiated through the stopper.

In a separate container, isobornyl methacrylate, styrene, and methacrylic ester 13.0 were combined.

An oxidant solution was then prepared by dissolving 0.0400 g t-butyl hydroperoxide (70%) in 3.75 g deionized water.

While maintaining nitrogen purge, the monomer mixture and the acetone co-solvent were slowly added to the reaction vessel. During the addition, the agitation rate was gradually increased to 350 rpm.

Several minutes after the monomer mixture and the acetone co-solvent additions were completed, the agitation rate was slowed to 225 rpm. Using a thermostatted water bath, the reaction temperature was brought to about 33° C. When the reaction temperature was about 33° C., the oxidizer solution was added to the reaction mixture in a single shot.

In a separate container, a reductant solution was prepared by dissolving 0.0739 g sodium ascorbate and 0.60 g of an 0.25 wt. % solution of iron (II) sulfate heptahydrate in deionized water in 7.50 g deionized water.

About 5 minutes after the oxidant solution was added to the reaction mixture, the reaction temperature was 35° C. At this point, the dark blue reductant solution was added via syringe to the reaction vessel in one shot while maintaining nitrogen purge.

Heating was continued using a water bath. An exothermic reaction was noted to occur, and the temperature of the reaction increased to a maximum of about 52° C. after 1 hour. It was thereafter maintained at or above 43° C. using the water bath. As the reaction progressed, a bluish tint was noted in the emulsion, and it became increasingly more translucent, and a slight increase in viscosity was noted. After a total of 6 h reaction time, the reaction was cooled and poured through cheesecloth into a container. Coagulum (caught on the cheesecloth) was noted and grit was measured.

The yield of polymer latex was 959 g. Solids (measured gravimetrically): 30.23%. Molecular weight by GPC-MALS (Method B): Mw=5,700.000.

Solid polymer was isolated by adding the undiluted emulsion polymer to a large excess of methanol. The resulting precipitate was collected by vacuum filtration and washed extensively with methanol.

Synthesis Examples S2S-22

Additional copolymers were prepared following the basic procedure used to prepare Synthesis Example 1. The compositions and properties of these polymers and those of Synthesis Examples S1 are summarized in the Table 1 below.

TABLE 1

| Ex. | P# | IBXMA | Styrn | IBMA | LMA | C13-MA | Tg (° C.) | Mw (kDa) |
|---|---|---|---|---|---|---|---|---|
| S1 |  | 39.0 | 39.0 | 0.0 | 0.0 | 22.0 | 79.9 | 5,700$^a$ |
| S2 |  | 25.0 | 22.0 | 41.5 | 11.5 | 0.0 | 76.3 | 7,100$^b$ |
| S3 |  | 25.0 | 22.0 | 36.0 | 17.0 | 0.0 | 67.1 | 11,000$^b$ |
| S4 | P47 | 25.0 | 40.0 | 18.0 | 17.0 | 0.0 | 72.2 | 6,200$^b$ |
| S5 | P50 | 25.0 | 58.0 | 0.0 | 17.0 | 0.0 | 82.5 | 5,600$^b$ |
| S6 |  | 25.0 | 22.0 | 28.0 | 25.0 | 0.0 | 58.1 | 20,000$^b$ |
| S7 | P52 | 25.0 | 50.0 | 0.0 | 25.0 | 0.0 | 64.2 | 12,000$^b$ |
| S8 |  | 25.0 | 35.0 | 10.0 | 30.0 | 0.0 | 53.5 | 17,000$^b$ |
| S9 |  | 25.0 | 22.0 | 18.0 | 35.0 | 0.0 | 44.3 | 33,000$^b$ |
| S10 |  | 25.0 | 40.0 | 0.0 | 35.0 | 0.0 | 42.8 | 28,000$^b$ |
| S11 |  | 44.0 | 25.0 | 0.0 | 0.0 | 31.0 | 62.6 | 11,400$^a$ |
| S12 |  | 47.0 | 14.0 | 0.0 | 0.0 | 39.0 | 72.1 | 23,200$^a$ |
| S13 |  | 62.0 | 27.0 | 0.0 | 0.0 | 11.0 | 118.7 | 5,900$^a$ |
| S14 |  | 62.0 | 11.0 | 0.0 | 0.0 | 27.0 | 102.6 | 8,200$^a$ |
| S15 |  | 69.0 | 15.5 | 0.0 | 0.0 | 15.5 | 123.0 | 6,100$^a$ |
| S16 |  | 80.0 | 15.0 | 0.0 | 0.0 | 5.0 | 153.1 | 2,500$^a$ |
| S17 |  | 80.0 | 0.0 | 0.0 | 0.0 | 20.0 | 154.5 | 5,900$^a$ |
| S18 | P69 | 65.0 | 0.0 | 30.0 | 0.0 | 5.0 | 126** | 5,300$^a$ |
| S19 | P69G | 65.0 | 0.0 | 30.0 | 0.0 | 5.0 | 126** | 3,700$^a$ |

IBXMA = isobornyl methacrylate;
Styrn = styrene;
IBMA = isobutyl methacrylate;
LMA = lauryl methacrylate (Sigma-Aldrich);
C13-MA: Methacrylic ester 13.0; CAS # 90551-76-1 (Evonik).
**Tg value estimated on basis of Fox equation
$^a$Molecular weight measurements by Method A.
$^b$Molecular weight measured by Method B.

Solubility Comparative Example 1

Polystyrene with a reported Mw of 280,000 was obtained from Sigma-Aldrich.

Solubility Comparative Example 2

Poly(isobutyl methacrylate) with a Mw of 300 kD and an inherent viscosity of 0.6 was obtained from Polysciences.

Solubility Comparative Examples CE3-CE6 and Less Preferred Samples E7-E10

These copolymer were prepared following the basic procedure used to prepare Synthesis Example S1.

The compositions and properties of these polymers and those of Comparative Examples 1 and 2 are summarized in the Table 2 below.

TABLE 2

| Ex | P# | IBXMA | Styrn | IBMA | LMA | C13-MA | Tg (° C.) | Mn (kDa) | Mw (kDa) | PDI |
|---|---|---|---|---|---|---|---|---|---|---|
| CE1 |  | 0.0 | 100.0 | 0.0 | 0.0 |  | 100* |  |  |  |
| CE2 |  | 0.0 | 0.0 | 100.0 | 0.0 |  | 53* |  |  |  |
| CE3 |  | 100.0 | 0.0 | 0.0 | 0.0 |  | 202 | 982$^a$ | 2,196$^a$ | 2.24$^a$ |
| CE4 |  | 25.0 | 28.0 | 47.0 | 0.0 |  | 94.6 |  | n.d. |  |
| CE5 |  | 25.0 | 43.0 | 32.0 | 0.0 |  | 96.6 |  | n.d. |  |
| CE6 |  | 25.0 | 58.0 | 17.0 | 0.0 |  | 104.2 |  | n.d. |  |
| E7 | P67 | 10.0 | 20.0 | 0.0 | 0.0 | 70.0 | 4.9 |  | n.d. |  |

TABLE 2-continued

| Ex | P# | IBXMA | Styrn | IBMA | LMA | C13-MA | Tg (° C.) | Mn (kDa) | Mw (kDa) | PDI |
|---|---|---|---|---|---|---|---|---|---|---|
| E8 | P66 | 20.0 | 0.0 | 0.0 | 0.0 | 80.0 | −21 | n.d. | | |
| E9 | | 25.0 | 37.6 | 29.4 | 8.0 | | 82.6 | n.d. | | |
| E10 | | 25.0 | 58.0 | 8.5 | 8.5 | | 133.8 | n.d. | | |

IBXMA = isobornyl methacrylate;
IBMA = isobutyl methacrylate;
Styrn = styrene;
LMA = lauryl methacrylate (Sigma-Aldrich);
C13-MA: Methacrylic ester 13.0;
CAS # 90551-76-1 (Evonik).
[a]Molecular weight was determined by Gel Permeation Chromatography (GPC) using narrow range polystyrene calibration standards. Column: (300 mm × 7.5 mm ID), Phenomenex Phenogel, Linear 5μ (2) mixed; Mobile phase: Tetrahydrofuran; Column oven: 40° C. Detection: RI Detector. Calibration was performed with conventional PS standards and using a 3$^{rd}$ order curve.
*Tg values from open literature.

Evaluation of Polymer Solubility in Diesel Fuel.
Solubility Index Method:

In a 20 mL vial with a cap, 0.2 g of polymer was added to 9.8 g diesel fuel. The resulting mixture was loosely capped stirred vigorously for 1 h at ambient room temperature (about 25° C.). The mixture was then heated to about 90° C. with stirring for 1 h. The resulting mixture or solution was allowed to cool to ambient room temperature and stand for 24 h. Polymer solubility was then determined by visual examination; polymers that showed any haze, turbidity or other signs of phase separation were judged to be insoluble. The mixture/solution was then placed in a refrigerator set at 8° C. for 24 h. Polymer solubility was then determined by visual examination; polymers that showed any haze, turbidity or other signs of phase separation were judged to be insoluble.

Cloud Point Determination Method:

To a 4-neck 250 mL round bottom flask equipped with an overhead mechanical stirrer, thermometer, condenser and septum/stopper was charged 5.0 g of polymer to 50.0 g of B7 diesel fuel. The resulting mixture was heated to 70-80° C. with stirring until a homogeneous solution was obtained. In the case of some comparative examples, e.g. for polystyrene, the polymer did not dissolve in B7 diesel fuel even after stirring at 140° C. for 3 hours. A portion of the resulting solution was transferred to a 40 mL vial while warm. For polymers with a cloud point above about 25° C., the solution was allowed to cool to about 25° C. while it was manually stirred with a thermometer. The reported cloud point is the temperature at which the solution visibly became turbid or cloudy. For polymers with a cloud point below about 25° C., the solution was cooled to a temperature below the point at which the solution became visibly turbid or cloudy using an ice/water bath or a dry ice/acetone bath. The resulting turbid/cloudy mixture was allowed to gradually warm up to 25° C., while it was manually stirred with a thermometer. The reported cloud point is the temperature at which the solution became clear. As a check, once the cloud point of a polymer was determined, clear solutions were gradually cooled (using cooling baths, if necessary) while stirring with a thermometer and the cloud point was confirmed.

The B7 diesel base fuel used was a B7 EN590 specification diesel base fuel having the characteristics given in Table 3 below. The results of the solubility evaluations of the Synthesis Examples are summarized in Table 4 below.

TABLE 3

| Parameter | Method | Units | |
|---|---|---|---|
| Cetane Number | DIN 51773 | — | 53.5 |
| Density @ 15° C. | DIN EN ISO 12185 | kg m$^{-3}$ | 836.9 |
| Distillation | DIN EN ISO 3405 | | |

TABLE 3-continued

| Parameter | Method | Units | |
|---|---|---|---|
| IBP | | ° C. | 179.2 |
| 5% v/v | | ° C. | 203.2 |
| 10% v/v | | ° C. | 214.4 |
| 20% v/v | | ° C. | 232.0 |
| 30% v/v | | ° C. | 247.1 |
| 40% v/v | | ° C. | 261.9 |
| 50% v/v | | ° C. | 276.2 |
| 60% v/v | | ° C. | 290.3 |
| 70% v/v | | ° C. | 305.0 |
| 80% v/v | | ° C. | 319.7 |
| 90% v/v | | ° C. | 335.9 |
| 95% v/v | | ° C. | 349.1 |
| FBP | | ° C. | 358.2 |
| Residue & loss | | % vol | 1.9 |
| Flash Point | DIN EN ISO 2719 | ° C. | 69.0 |
| Viscosity @ 40° C. | DIN EN ISO 3104 | mm$^2$ s$^{-1}$ | 2.8687 |
| Sulphur - | DIN EN ISO 20884 | mg/kg | <10 |
| CFPP | DIN EN 116 | ° C. | −29 |
| Cloud point | DIN EN 23015 | ° C. | −8 |
| Fatty acid methyl ester | DIN EN 14078 | % vol | 6.4 |

TABLE 4

Polymer Solubility Evaluation Results.

| Ex | IBXMA | Styrn | IBMA | LMA | C13-MA | Tg (° C.) | Cloud point @ 9.1% in B7 (° C.) |
|---|---|---|---|---|---|---|---|
| CE1 | 0.0 | 100.0 | 0.0 | 0.0 | 0.0 | 100* | >140 |
| CE2 | 0.0 | 0.0 | 100.0 | 0.0 | 0.0 | 53* | 45 |
| CE3 | 100.0 | 0.0 | 0.0 | 0.0 | 0.0 | 202 | −2 |
| CE4 | 25.0 | 28.0 | 47.0 | 0.0 | 0.0 | 94.6 | 43 |
| CE5 | 25.0 | 43.0 | 32.0 | 0.0 | 0.0 | 96.6 | >50 |
| CE6 | 25.0 | 58.0 | 17.0 | 0.0 | 0.0 | 104.2 | >50 |
| E7 | 10.0 | 20.0 | 0.0 | 70.0 | 0.0 | 4.9 | <25 |
| E8 | 20.0 | 0.0 | 0.0 | 80.0 | 0.0 | −21 | <25 |
| E9 | 25.0 | 37.6 | 29.4 | 8.0 | 0.0 | 82.6 | 33 |
| E10 | 25.0 | 58.0 | 8.5 | 8.5 | 0.0 | 133.8 | 46 |
| S1 | 39.0 | 39.0 | 0.0 | 0.0 | 22.0 | 79.9 | 1 |
| S2 | 25.0 | 22.0 | 41.5 | 11.5 | 0.0 | 76.3 | <25 |
| S3 | 25.0 | 22.0 | 36.0 | 17.0 | 0.0 | 67.1 | <25 |
| S4 | 25.0 | 40.0 | 18.0 | 17.0 | 0.0 | 72.2 | 16 |
| S5 | 25.0 | 58.0 | 0.0 | 17.0 | 0.0 | 82.5 | 19 |
| S6 | 25.0 | 22.0 | 28.0 | 25.0 | 0.0 | 58.1 | <25 |
| S7 | 25.0 | 50.0 | 0.0 | 25.0 | 0.0 | 64.2 | −3 |
| S8 | 25.0 | 35.0 | 10.0 | 30.0 | 0.0 | 53.5 | <25 |
| S9 | 25.0 | 22.0 | 18.0 | 35.0 | 0.0 | 44.3 | <25 |
| S10 | 25.0 | 40.0 | 0.0 | 35.0 | 0.0 | 42.8 | −5 |
| S11 | 44.0 | 25.0 | 0.0 | 0.0 | 31.0 | 62.6 | −1 |
| S12 | 47.0 | 14.0 | 0.0 | 0.0 | 39.0 | 72.1 | −5 |
| S13 | 62.0 | 27.0 | 0.0 | 0.0 | 11.0 | 118.7 | −3 |
| S14 | 62.0 | 11.0 | 0.0 | 0.0 | 27.0 | 102.6 | −5 |

TABLE 4-continued

Polymer Solubility Evaluation Results.

| Ex | IBXMA | Styrn | IBMA | LMA | C13-MA | Tg (° C.) | Cloud point @ 9.1% in B7 (° C.) |
|---|---|---|---|---|---|---|---|
| S15 | 69.0 | 15.5 | 0.0 | 0.0 | 15.5 | 122.7 | −2 |
| S16 | 80.0 | 15.0 | 0.0 | 0.0 | 5.0 | 153.1 | 0 |
| S17 | 80.0 | 0.0 | 0.0 | 0.0 | 20.0 | 154.5 | −5 |
| S18 | 65.0 | 0.0 | 30.0 | 0.0 | 5.0 | 126** | −3 |
| S19 | 65.0 | 0.0 | 30.0 | 0.0 | 5.0 | 126** | −3 |

IBXMA = isobornyl methacrylate;
Styrn = styrene;
IBMA = isobutyl methacrylate;
LMA = lauryl methacrylate (Sigma-Aldrich);
C13-MA: Methacrylic ester 13.0;
CAS # 90551-76-1.
*Tg values from open literature.
**Tg value estimated on basis of Fox equation.

The homopolymer of styrene is not soluble in B7 diesel base fuel, but surprisingly large amounts of this monomer can be copolymerized with isobornyl methacrylate and lauryl methacrylate to give highly soluble copolymers. For example, based on weight fraction of each comonomer in Example S5, one would expect the cloud point at 9.1 wt. % of this copolymer to be about 78° C. using a linear mixing model. Instead, it is 19° C., which is significantly and usefully different from the predicted value. Similarly, the predicted cloud point of S4, which contains 40 wt. % of the insoluble comonomer styrene and 18 wt. % of another insoluble monomer, isobutyl methacrylate, is about 61° C., which is above the range of sufficient solubility, while the actual cloud point is 16° C., which is usefully within the preferred range of sufficient solubility. Also, the measured Tgs of these polymers are above 65° C., which is in the more preferred range of Tg.

In comparative examples CE4-CE6 no fatty-alkyl (meth)acrylate is present and these polymers have undesired solubility in diesel (cloud points greater than 25° C.).

Examples E7-E10 are less preferred since they have either an undesired low Tg or an undesired high cloud point, which makes handling them very difficult.

Comparative Examples 7-9

In CE7 example 12 of EP-A-0626442 was reworked. The resulting polymers had a Mw of about 95 kD. The molecular weight was too low to efficiently influence the rheology of a fluid in which the polymer is dissolved.

In CE8 the preparation 4 of U.S. Pat. No. 4,188,219 and in CE9 example 3 of EP1260278 were reworked. However in the rework of both of these examples, no polymeric material could be produced.

Diesel Fuel Test

The following fuel blends were prepared for testing. First a concentrate was made in the diesel base fuel, which concentrate contains at least 2.5 wt % of the copolymer, which was subsequently diluted with further diesel base fuel to yield a fuel composition having the desired mg/kg concentration. The amount of copolymer present is indicated in ppm based on the total weight of the fuel composition. The base fuel used had the specification given in Table 3 above.

| Fuel/Fuel blend # | Fuel blend composition Copolymer # | Amount of copolymer (ppm) |
|---|---|---|
| B7 | none | 0 |
| P47 | S4 | 50 |
| P50 | S5 | 50 |
| P52 | S7 | 50 |
| P66 | E8 | 50 |
| P67 | E7 | 50 |

The fuel blends to be tested were subjected to ignition testing in a Combustion Research Unit (CRU) obtained from Fueltech Solutions AS/Norway The CRU can mimic combustion conditions in modern diesel engines. It is described in Proceedings of the Combustion Institute 35 (2015) 2967-2974. The CRU features an injection system based on industry-standard high pressure common rail injector. Fuels were injected into a constant volume combustion chamber preconditioned as set out in the table below.

| Condition | Temp (° C.) | Chamber pressure (bar) | Fuel pressure (bar) | Main injection period (µs) | Number of injections |
|---|---|---|---|---|---|
| 1 | 590 | 30 | 900 | 900 | 5 |

The CRU delivers pressure-temperature charts of the ignition process from which the ignition delay (ID), burn period (BP) and maximum pressure increase (MPI) can be determined. The ignition delay is defined as the time taken for the pressure in the combustion chamber to rise to 0.2 bar above its initial value ($ID^{0.2}$). The burn period is defined as the time from the moment where the chamber pressure equals its initial value plus 10% of MPI to the moment when the chamber equals its initial value plus 90% of MPI.

The results obtained are set out in the table below. Data are also provided in the table for the maximum rate of heat release (Max ROHR) and the time taken to maximum rate of heat release (T of max ROHR) for each sample tested. Max ROHR is a measure of how vigorous is the combustion. A higher number indicates that once the fuel has ignited, the speed at which the flame moves through the fuel is faster.

| Fuel/ Fuel blend | $ID^{0.2}$ (msec) | ID % change from base | BP (msec) | BP % change from base | Max ROHR (bar/msec) | T of max ROHR (msec) | T of max ROHR % change from base |
|---|---|---|---|---|---|---|---|
| B7 | 1.676 | 0 | 0.682 | 0 | 15.225 | 2.221 | 0 |
| P47 | 1.654 | −1.31 | 0.703 | 3.03 | 15.043 | 2.198 | −1.06 |
| P50 | 1.652 | −1.43 | 0.704 | 3.20 | 14.975 | 2.195 | −1.17 |
| P52 | 1.654 | −1.32 | 0.707 | 3.62 | 14.993 | 2.200 | −0.95 |
| P66 | 1.651 | −1.48 | 0.711 | 4.25 | 14.949 | 2.196 | −1.15 |
| P67 | 1.658 | −1.11 | 0.705 | 3.34 | 15.165 | 2.203 | −0.81 |

These data show that, when used in a diesel fuel, the copolymers as used in the invention provided a performance benefit. The percentage change over the base fuel is mostly quoted to a 99 or 95% confidence level.

These data show that the fuel compositions that incorporate the copolymer have improved combustion characteristics, even those less preferred in view of Tg and/or cloud point properties.

The fuel compositions of the invention display an earlier ignition (shorter ignition delay) than the base fuel without the copolymer. A shorter ignition delay is known in the art to improve cold start ability, & reduce combustion noise. By decreasing ignition delay, the thermal efficiency of an engine stroke is improved, providing better combustion. These benefits of a shorter ignition delay are the same type of benefit as that obtained from an increased cetane number in a diesel fuel.

An earlier ignition also provides more power and therefore a shorter ignition delay is an indicator of the additional benefit of improving the power output of an engine.

While the ignition delay data show changes in terms of fractions of a millisecond, that data is significant at a 95% confidence level. In a diesel engine the crankshaft revolves through a full 360 degrees. At a vehicle operating at 2,000 rpm there will be 12,000 degrees of crank rotation per second (360×2000/60). This corresponds to 12 degrees of crank rotation per millisecond. A shortening of ignition delay by a fraction of a millisecond can mean a big difference in the phasing of the combustion in the engine.

High ROHR is also known to correlate with high combustion noise and so a reduction in the Max ROHR, and in the time to achieve it, also shows reduced combustion noise.

While not wishing to be bound by this theory, it is believed that the improved performance benefits are because of a modified rheology due to the use of the polymer in the fuel, which leads to an improved atomization of the fuel and a more complete combustion.

Engine Test

Two fuels were subjected to an engine test: a reference fuel which was a B5 diesel base fuel and a candidate fuel which was the same B5 diesel base fuel as the reference fuel with the addition of 120 ppm of the polymer of Synthesis Example S19.

The engine used in this engine test was a Euro 5 engine with the following specification:

| Cylinder/Valves per cylinder | 4/4 (DOHC) |
|---|---|
| Displacement | 1.968 ltr |
| Max. Power | 103 kW @ 4200 min$^{-1}$ |
| Max. Torque | 320 Nm @ 1750-2500 min$^{-1}$ |
| Compression | 16.5:1 |
| Engine management | Bosch EDC 17 |
| Emission standard | Euro 5 |
| Injectors | Common Rail Solenoid-operated |
| Air/emissions management | Single stage turbo with VGT and after-cooler, high pressure EGR, DOC and DPF |

The engine was held at a constant engine speed of 2000 rpm, in fourth gear and at full load, and the peak pressure and the torque produced were measured.

The candidate fuel containing the polymer of Synthesis Example S19 provided a 0.208% torque benefit relative to the reference fuel and a 0.203% peak pressure benefit relative to the reference fuel.

That which is claimed is:

1. A fuel composition for powering a combustion engine, the composition comprising:
   a liquid base fuel; and
   a copolymer formed by copolymerizing monomers, the monomers comprising at least the following:
   at least one bicyclic methacrylate ester at a concentration of 10 wt. % to 95 wt. %, wherein the at least one bicyclic methacrylate ester is according to Formula I:

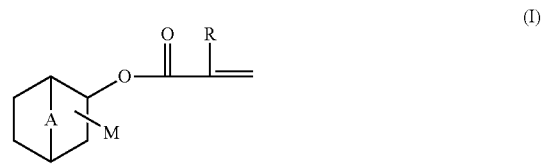

wherein:
   R is selected from the group consisting of H and —CH$_3$,
   A is selected from the group consisting of —CH$_2$—, —CH(CH$_3$)—, and —C(CH$_3$)$_2$—, and
   M is covalently bonded to a carbon atom of a six-membered ring and is selected from the group consisting of hydrogen, a methyl group, and a plurality thereof;
   at least one fatty-alkyl (meth)acrylate at a concentration of 5 wt. % to 40 wt %, wherein the fatty-alkyl (meth)acrylate is a C$_8$-C$_{24}$ alkyl (meth)acrylate, wherein the C$_8$-C$_{24}$ alkyl group can be linear or branched, substituted or unsubstituted, saturated or unsaturated;
   at least one aromatic vinyl monomer at a concentration of 0 wt. % to 65 wt. %; and
   other ethylenically unsaturated monomers at a concentration of 0 wt. % to 50 wt. %,
   wherein the copolymer comprises up to a total of 100 wt. %,
   wherein the weight percentages of the monomers are based on the total weight of all the monomers,
   wherein the copolymer has a weight averaged molecular weight of 1,500,000 Dalton to 50,000,000 Dalton, and
   wherein a weight percentage of below 5% of divinylbenzene is added to the copolymer.

2. The fuel composition according to claim 1, wherein one or more of
   the bicyclic (meth)acrylate ester is at the concentration of 60 wt % to 95 wt %;
   the fatty-alkyl (meth)acrylate is at the concentration of 15 wt % to 25 wt %;
   the aromatic vinyl monomer is at the concentration of 10 wt % to 35 wt %;
   the other ethylenically unsaturated monomers are at the concentration of 0 wt % to 30 wt %, up to a total of 100 wt %, wherein the weight percentages of the monomer are based on the total weight of all the monomers.

3. The fuel composition according to claim 1, wherein the concentration of a total of bicyclic (meth)acrylate ester and fatty-alkyl (meth)acrylate is 35 wt. % or more, by weight of the copolymer.

4. The fuel composition according to claim 1, wherein the concentration of a total of bicyclic (meth)acrylate ester and aromatic vinyl monomer is 35 wt % or more, by weight of the copolymer.

5. The fuel composition according to claim 1, wherein the at least one bicyclic (meth)acrylate ester comprises, or is, isobornyl methacrylate.

6. The fuel composition according to claim 1, wherein the at least one fatty-alkyl methacrylate comprises, or is, lauryl (meth)acrylate, methacrylic ester 13.0, and/or iso-dec (meth)acrylate.

7. The fuel composition according to claim 1, wherein the at least one aromatic vinyl monomer comprises, or is, styrene.

8. The fuel composition according to claim 1, wherein the copolymer has a weight average molecular weight of at least 2,000,000 Dalton.

9. The fuel composition according to claim 1, wherein the copolymer has a glass transition temperature in the range of from 50° C. to 190° C.

10. The fuel composition according to claim 1, wherein the base fuel is a diesel base fuel and the fuel composition is a diesel fuel composition.

11. The fuel composition according to claim 1, wherein the amount of copolymer present in the fuel composition is in the range of from 10 ppm to 100 ppm, by weight of the fuel composition.

12. A method of blending a fuel composition, the method comprising:
   blending a copolymer or a copolymer component containing the copolymer with a base fuel,
   wherein the copolymer is formed by copolymerizing monomers, the monomers comprising at least the following:
      at least one bicyclic (meth)acrylate ester at a concentration of 10 wt. % to 95 wt. %, wherein the at least one bicyclic (meth)acrylate ester is according to Formula I:

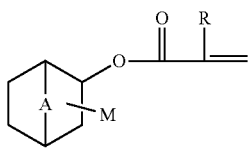

(I)

wherein:
   R is selected from the group consisting of H and —CH$_3$,
   A is selected from the group consisting of —CH$_2$—, —CH(CH$_3$)—, and —C(CH$_3$)$_2$—, and M is covalently bonded to a carbon atom of a six-membered ring and is selected from the group consisting of hydrogen, a methyl group, and a plurality thereof;

at least one fatty-alkyl (meth)acrylate at a concentration of 5 wt. % to 40 wt %, wherein the fatty-alkyl (meth)acrylate is a C$_8$-C$_{24}$ alkyl (meth)acrylate, wherein the C$_8$-C$_{24}$ alkyl group can be linear or branched, substituted or unsubstituted, saturated or unsaturated;

at least one aromatic vinyl monomer at a concentration of 0 wt. % to 65 wt. %; and other ethylenically unsaturated monomers at a concentration of 0 wt. % to 50 wt. %, wherein the copolymer comprises up to a total of 100 wt. %, wherein the weight percentages of the monomers are based on the total weight of all the monomers, wherein the copolymer has a weight averaged molecular weight of 1,500,000 Dalton to 50,000,000 Dalton, and wherein a weight percentage of below 5% of divinylbenzene is added to the copolymer.

\* \* \* \* \*

UNITED STATES PATENT AND TRADEMARK OFFICE
CERTIFICATE OF CORRECTION

PATENT NO. : 11,001,775 B2
APPLICATION NO. : 15/575835
DATED : May 11, 2021
INVENTOR(S) : Mark Lawrence Brewer et al.

It is certified that error appears in the above-identified patent and that said Letters Patent is hereby corrected as shown below:

In the Specification

In Column 6, Line 50, delete "calorimetry" and insert -- Calorimetry --, therefor.

In Column 9, Line 43, delete "hydroisomerisation" and insert -- hydroisomerization --, therefor.

In Column 10, Line 17, delete "(FAAEs)," and insert -- (FAMEs), --, therefor.

In Column 10, Line 42, delete "Ci" and insert -- C1 --, therefor.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*